United States Patent
Takamatsu

(10) Patent No.: US 10,024,529 B2
(45) Date of Patent: *Jul. 17, 2018

(54) LIGHT SOURCE APPARATUS AND PROJECTOR APPARATUS

(71) Applicant: Sony Corporation, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,002

(22) Filed: Feb. 21, 2017

(65) Prior Publication Data

US 2017/0159926 A1 Jun. 8, 2017

Related U.S. Application Data

(63) Continuation of application No. 15/083,343, filed on Mar. 29, 2016, now Pat. No. 9,657,932, which is a continuation of application No. 14/032,303, filed on Sep. 20, 2013, now Pat. No. 9,328,909.

(30) Foreign Application Priority Data

Sep. 26, 2012 (JP) ................................ 2012-211621

(51) Int. Cl.
| | |
|---|---|
| *G03B 21/16* | (2006.01) |
| *F21V 29/71* | (2015.01) |
| *F21V 29/503* | (2015.01) |
| *F21V 29/74* | (2015.01) |
| *G03B 21/20* | (2006.01) |
| *F21Y 115/30* | (2016.01) |

(52) U.S. Cl.
CPC .......... *F21V 29/713* (2015.01); *F21V 29/503* (2015.01); *F21V 29/74* (2015.01); *G03B 21/16* (2013.01); *G03B 21/2033* (2013.01); *F21Y 2115/30* (2016.08)

(58) Field of Classification Search
CPC ...... G03B 21/14; G03B 21/16; H04N 9/3105; H04N 9/3144; H04N 9/3197
See application file for complete search history.

(56) References Cited

U.S. PATENT DOCUMENTS

| | | | |
|---|---|---|---|
| 8,398,245 B2 | 3/2013 | Yanagisawa et al. | |
| 8,801,198 B2 | 8/2014 | Hirosawa | |
| 2001/0013924 A1 | 8/2001 | Yokoyama et al. | |
| 2005/0200813 A1 | 9/2005 | Kitabayashi | |
| 2005/0254013 A1 | 11/2005 | Engle et al. | |
| 2007/0103646 A1 | 5/2007 | Young | |
| 2007/0291234 A1 | 12/2007 | Momose et al. | |
| 2009/0086171 A1 | 4/2009 | Sun | |
| 2010/0171935 A1 | 7/2010 | Yamagishi | |
| 2011/0051096 A1* | 3/2011 | Mochizuki | H04N 9/3105 353/31 |
| 2012/0063116 A1* | 3/2012 | Baxter | F21V 29/673 362/6 |
| 2012/0327377 A1 | 12/2012 | Ohsugi | |
| 2013/0050663 A1 | 2/2013 | Hayashi | |

* cited by examiner

*Primary Examiner* — Sultan Chowdhury
(74) *Attorney, Agent, or Firm* — Haug Partners LLP; William S. Frommer

(57) ABSTRACT

There is provided a light source apparatus including a light source, a spreader to spread heat, and a conductor having a plurality of parts to conduct heat diffused from the light source. There is also provided a projector apparatus includes the light source apparatus.

16 Claims, 3 Drawing Sheets

LIGHT SOURCE APPARATUS AND PROJECTOR APPARATUS

This is a continuation of application Ser. No. 15/083,343, filed Mar. 29, 2016, which is a continuation of application Ser. No. 14/032,303, filed Sep. 20, 2013, now U.S. Pat. No. 9,328,909, which is entitled to the priority filing date of Japanese application(s) 2012-211621, filed on Sep. 26, 2012, the entirety of which is incorporated herein by reference.

BACKGROUND

The present technology relates to a light source apparatus and a projector apparatus. More particularly, the present technology relates to a light source apparatus and a projector apparatus capable of effectively dissipating heat generated.

SUMMARY

Projectors that project images or texts on screens become popular. Many of the projectors use high-intensity discharge lamps as light sources. In recent years, those using light-emitting diodes, laser diodes or the like have been developed.

In the projectors, high light intensity is necessary for brighten. When the light intensity is increased, heat generated from the light source is also increased. Its countermeasure is necessary. For example, Japanese Patent Application Laid-open No. 2011-76781 suggests that a heat dissipating member is attached to the light source to counter the heat generated.

Japanese Patent Application Laid-open No. 2011-76781 suggests that a heat sink having heat dissipation fins arranged at light sources is disposed via a heat transfer member to release heat generated from the light sources.

In such a configuration, when a side where the light sources of the heat transfer member is defined as a front surface, heat is received at the front surface. As a result, flatness at a back surface is not easily provided and accuracy is difficult to be regulated. The heat from the light sources is transferred to other member disposed at the front surface of the light sources such as a lens, whereby properties may be degraded.

In view of the above-mentioned circumstances, it is desirable to provide a configuration that can dissipate heat emitted from the light source.

According to an embodiment of the present technology, a light source apparatus includes a light source, and a conductor to conduct heat diffused from the light source to a spreader to spread heat, the conductor having a plurality of parts.

The conductor may include a first part to conduct heat diffused from a back surface of the light source when a light emitted side of the light source is defined as a front surface, and a second part to conduct heat diffused from a lateral surface of the light source.

The second part may be sandwiched between the first part and a third part.

The first part may be made of a material different from the second part.

The conductor may include a first part to directly conduct heat from the light source to the spreader, and a second part to indirectly conduct heat diffused from the light source to the spreader. The second part may be sandwiched between the first part and a third part.

A projector apparatus according to an embodiment of the present technology includes a light source, and a conductor to conduct heat diffused from the light source to a spreader to spread heat, the conductor having a plurality of parts.

In the light source apparatus according to the embodiment of the present technology, the conductor to conduct the heat diffused from the light source to the spreader to spread heat has a plurality of the parts.

In the projector apparatus according to the embodiment of the present technology, the conductor to conduct the heat diffused from the light source to the spreader to spread heat has a plurality of the parts.

According to the embodiment of the present technology, there is provided a configuration that can dissipate heat emitted from the light source.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.

The embodiments of the present technology will be described in the following order.
1. Configuration of Light Source Apparatus
2. Configuration of Heat Spreader
3. Heat Conduction <Configuration of Light Source Apparatus>

A light source apparatus as described below includes a light-emitting member such as a discharge lamp, an LED (Light Emitting Diode) and a laser diode. The light source apparatus as described below can be incorporated into a light-utilizing apparatus such as a projector, a scanner, and a backlight of a television receiver.

Figure 1:
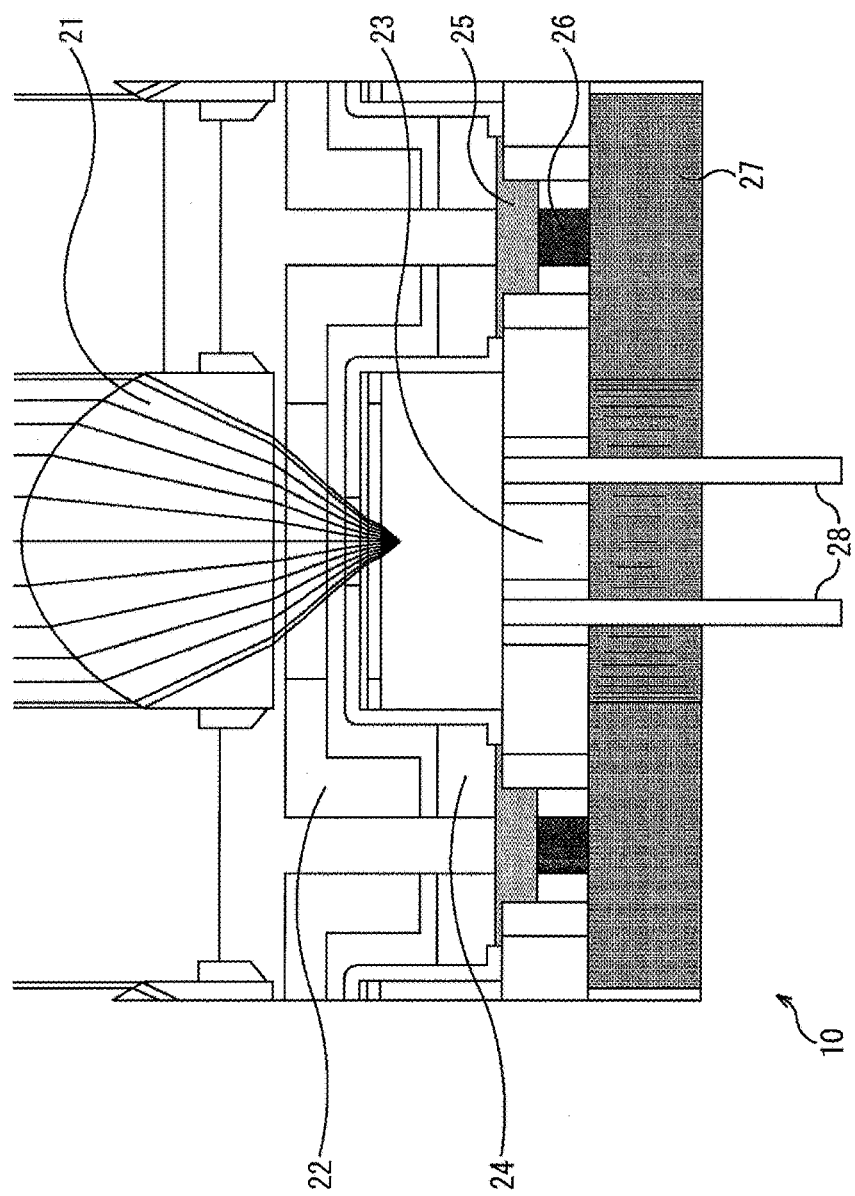
FIG. 1 is a diagram showing a configuration of an embodiment of an optical apparatus to which the present technology is applied.
Figure 2:
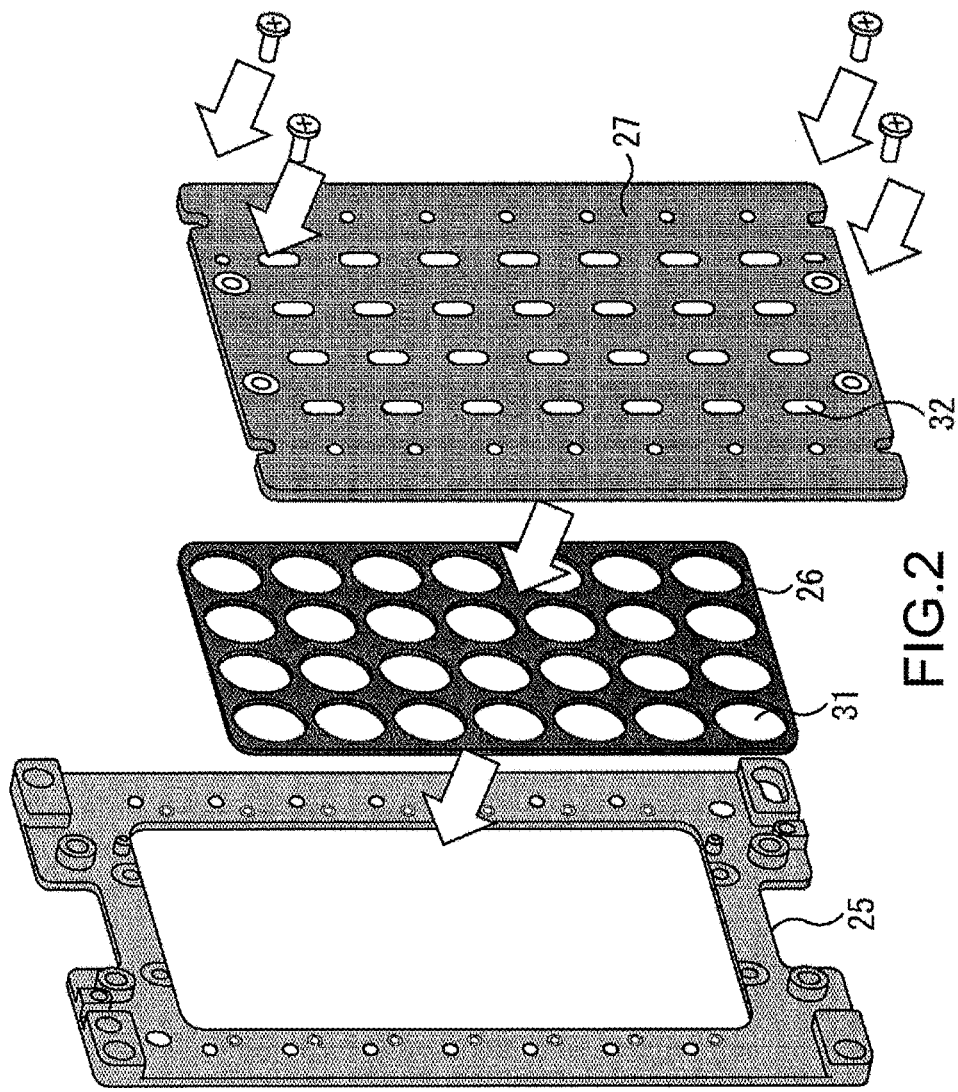
FIG. 2 is a diagram showing a configuration of a heat spreader.

In the following, the light source apparatus to which the present technology is applied will be illustrated by applying it to a projector. FIG. 1 is a diagram showing a cross-sectional configuration of the light source apparatus included in the projector. FIG. 2 is a diagram showing a configuration of a heat dissipation part of the light source apparatus as shown in FIG. 1.

A light source apparatus 10 shown in FIG. 1 includes a lens 21, a lens base 22, a laser 23, a laser holder 24, a heat spreader base 25, a lateral surface heat dissipation plate 26 and a back surface heat dissipation plate 27 from the top in FIG. 1.

The light source apparatus 10 as shown in FIG. 1, the laser diode is used as the light source. It is also possible to use the LED as the light source instead of the laser diode. The light source apparatus 10 as shown in FIG. 1 is a member to configure a part of the projector, and includes the lens 21 and the lens base 22. Also, the light source apparatus 10 may be mounted on an apparatus other than the projector. When the light source apparatus 10 is mounted on the apparatus other than the projector, the configuration of the light source apparatus 10 may be changed to fit the apparatus.

The lens base 22 is a part to attach the lens 21, and has a mechanism to hold the lens 21. Under the lens 21, the laser 23 is disposed. The laser holder 24 is a part to attach the laser 23, and has a mechanism to hold the laser 23. By this configuration, directionality of a light emitted from the laser 23 can be improved by the lens 21, and the laser 23 can be used as the light source of the projector.

The laser 23 has to be kept within a rated temperature range. As a light conversion efficiency of the laser 23 is not 100%, a part of electricity supplied is diffused as heat. Accordingly, a mechanism to spread the heat diffused from the laser 23 is necessary, when the laser 23 is used.

According to the embodiment, the heat spreader base 25, the lateral surface heat dissipation plate 26 and the back surface heat dissipation plate 27 are included in order to spread the heat diffused from the laser 23. Although not shown, the back surface heat dissipation plate 27 includes a heat sink as appropriate. The heat sink can also constitute the mechanism to spread the heat diffused from the laser 23.

In the following description, the heat spreader refers to the mechanism including at least one of the heat spreader base 25, the lateral surface heat dissipation plate 26 and the back surface heat dissipation plate 27, and the heat spreader may include the heat sink. The heat spreader is divided into a spreader to spread heat and a conductor to conduct the heat to the spreader. The conductor includes at least one of the lateral surface heat dissipation plate 26 and the back surface heat dissipation plate 27. The conductor can be the heat sink.

<Configuration of Heat Spreader>

As shown in FIG. 2, the lateral surface heat dissipation plate 26 is disposed between the heat spreader base 25 and the back surface heat dissipation plate 27. The lateral surface heat dissipation plate 26 is sandwiched between the heat spreader base 25 and the back surface heat dissipation plate 27 that is screwed to the heat spreader base 25. Although not shown in FIGS. 1 and 2, to back surface heat dissipation plate 27, the heat sink having heat dissipation fins is connected, as appropriate.

The lateral surface heat dissipation plate 26 as shown in FIG. 2 has a total of twenty-eight through-holes 31 with four lines×seven columns. The laser 23 is engaged in each of the through-holes 31. FIG. 1 shows a cross-sectional view of the laser 23 engaged in one hole of the lateral surface heat dissipation plate 26.

The lateral surface heat dissipation plate 26 as shown in FIG. 2 has the through-holes 31 in which a total of twenty-eight lasers 23 are engaged. However, the number of the through-holes 31 formed in the lateral surface heat dissipation plate 26, i.e., the number of the lasers 23 engaged in the lateral surface heat dissipation plate 26 is not limited to twenty-eight. For example, the number of the through-holes 31 (the number of lasers 23) can be greater than twenty-eight when the light source apparatus 10 is mounted on a large-size projector, or can be smaller than twenty-eight the light source apparatus 10 is mounted on a small-size projector. Thus, the number may be determined depending on the product.

The back surface heat dissipation plate 27 has through-holes 32 to pass through terminals 28 (in FIG. 1) connected to the laser 23 at positions corresponding to the through-holes 31 of the lateral surface heat dissipation plate 26. The number of the through-holes 32 in the back surface heat dissipation plate 27 is the same as the number of the thorough-holes 31 of the lateral surface heat dissipation plate 26.

A size or a shape of the lateral surface heat dissipation plate 26 can be determined depending on the product. For example, when a total of twenty-eight through-holes 31 is necessary for the product, one lateral surface heat dissipation plate 26 may include a total of twenty-eight through-holes 31 as shown in FIG. 2, or a plurality of lateral surface heat dissipation plates 26 may include a total of twenty-eight through-holes 31. Sizes or shapes of the heat spreader base 25 and the back surface heat dissipation plate 27 are determined depending on the size or the shape of the lateral surface heat dissipation plate 26.

As described above, the heat spreader base 25, the lateral surface heat dissipation plate 26 and the back surface heat dissipation plate 27 are included in order to spread the heat diffused from the laser 23. As described above and below, the heat spreader is configured by a plurality of parts, i.e., the heat spreader base 25, the lateral surface heat dissipation plate 26 and the back surface heat dissipation plate 27, thereby determining the size or the shape in parts by parts. This allows a degree of freedom in setting the heat spreader to be high, and the heat spreader can be configured to fit the product for spreading heat.

A degree of freedom in setting not only the shape but also a material of the heat spreader base 25, the lateral surface heat dissipation plate 26 or the back surface heat dissipation plate 27 is high. The lateral surface heat dissipation plate 26 or the back surface heat dissipation plate 27 can be made by forming a metal such as copper and aluminum. For example, one of the lateral surface heat dissipation plate 26 and the back surface heat dissipation plate 27 may be made of copper, and the other may be made of aluminum. Both of them may be made of copper or aluminum.

When a cooling property is important, the lateral surface heat dissipation plate 26 and the back surface heat dissipation plate 27 may be made of a material having a good thermal conduction. When a cooling property is not so important, either of the lateral surface heat dissipation plate 26 and the back surface heat dissipation plate 27 may be made of a material having a good thermal conduction.

Figure 3:
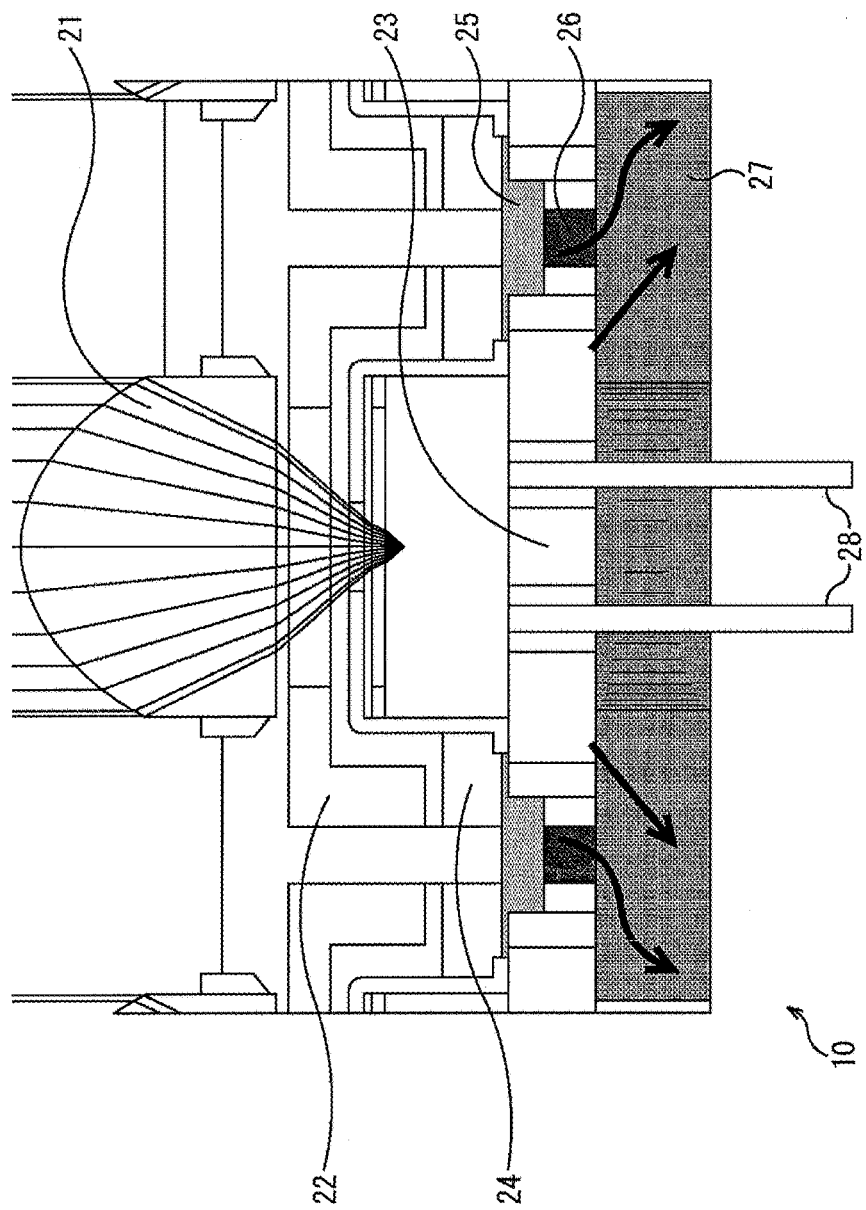
FIG. 3 is a diagram for illustrating heat conduction.

The lateral surface heat dissipation plate 26 has a function that lateral surface heat from the laser 23 is conducted to the back surface heat dissipation plate 27 as illustrated by referring to FIG. 3. When a cooling property is not so important, the lateral surface heat dissipation plate 26 may be omitted. In this case, the heat spreader may be configured of the heat spreader base 25 and the back surface heat dissipation plate 27.

The number of the lateral surface heat dissipation plate 26 is not limited to one. A plurality of lateral surface heat dissipation plates 26 may be used. When the heat spreader includes the heat sink, the back surface heat dissipation plate 27 and the heat sink may be formed as separate parts or as one part. When they are formed as separate parts, they may be formed of different materials.

As described above, the degree of freedom in setting the heat spreader becomes high, and the heat spreader can be configured to fit the product for spreading heat.

<Heat Conduction>

Referring to FIG. 3, thermal conduction paths of heat diffused from the laser 23 will be described. A light source apparatus 10 shown in FIG. 3 is the same as the light source apparatus 10 shown in FIG. 1. In FIG. 3, the thermal conduction paths from the laser 23 are shown by arrows. Most of heat generated from the laser 23 is released from a lower surface of the laser 23. In order to efficiently spread the heat released from the lower surface of the laser 23, the heat diffused from the laser 23 is directly conducted to the back surface heat dissipation plate 27.

A heat transfer material such as grease is coated between the laser 23 and the back surface heat dissipation plate 27 to improve a thermal contact so that the heat from the laser 23 is conducted to the back surface heat dissipation plate 27. The heat conducted to the back surface heat dissipation plate 27 is also conducted to the heat sink (not shown), and is spread from the heat sink. Therefore, the grease is applied between the back surface heat dissipation plate 27 and the heat sink in order to keep a good thermal contact.

Thus, the back surface heat dissipation plate 27 is provided in order to directly conduct the heat diffused from the laser 23 to the heat sink that functions as a spreader to spread heat. The heat is conducted from the laser 23 to the back surface heat dissipation plate 27 and from the back surface heat dissipation plate 27 to the heat sink such that the heat generated from the laser 23 is spread.

Furthermore, according to the embodiment, the heat is conducted from the lateral surface heat dissipation plate 26 to the back surface heat dissipation plate 27. For example, grease is coated between the lateral surface heat dissipation plate 26 and the back surface heat dissipation plate 27 to keep a good thermal contact. The heat diffused from the laser 23, in particular, the heat from the lateral surface of the laser 23 (the heat leaked to the lateral surface of the laser 23) is conducted to the lateral surface heat dissipation plate 26. As the lateral surface heat dissipation plate 26 is configured to keep a good thermal contact with the back surface heat dissipation plate 27, the heat is conducted from the lateral surface heat dissipation plate 26 to the back surface heat dissipation plate 27. The heat conducted to the back surface heat dissipation plate 27 is also conducted to the heat sink, and is spread.

Thus, the lateral surface heat dissipation plate 26 is provided for indirectly conducting the heat diffused from the laser 23 to the heat sink that functions as a spreader to spread heat.

In this way, the heat from the laser 23 is conducted to the back surface heat dissipation plate 27 via the lateral surface heat dissipation plate 26 and to the heat sink, and is then spread. It is thus possible to efficiently absorb and spread the heat from the lateral surface of the laser 23.

As described above, the heat generated from around the lower surface of the laser 23 and the heat generated from around the lateral surface can be efficiently conducted to the heat sink (not shown) by the lateral surface heat dissipation plate 26 and the back surface heat dissipation plate 27. It is thus possible to remove unnecessary heat generated from the laser 23. In other words, the present technology allows the thermal conduction path for cooling the laser 23 and its surroundings to be broaden.

When the heat spreader to conduct the heat from the laser 23 to the heat sink is configured by the heat spreader base 25, the lateral surface heat dissipation plate 26 and the back surface heat dissipation plate 27, a degree of freedom in setting the heat spreader can be enhanced and the configuration can be fit to a desirable cooling property.

For example, the heat spreader shown in FIGS. 1 and 2 is configured by the heat spreader base 25, the lateral surface heat dissipation plate 26 and the back surface heat dissipation plate 27. Any modification may be made as follows: When a cooling property is desired to be enhanced, the lateral surface heat dissipation plate 26 is provided. When a cooling property is not desired to be enhanced, no lateral surface heat dissipation plate 26 is provided.

When no lateral surface heat dissipation plate 26 is provided, no heat spreader base 25 may be provided, i.e., only a back surface heat dissipation plate 27 may be provided.

In this way, a change in the cooling property of the heat spreader can be adjusted only by providing a part or parts (a component or components) or removing a part or parts (a component or components). Such a change is made easily. It is also easy to change a material or materials of the part or the parts. By changing the material or materials, the cooling property, costs etc. can be adjusted.

For example, aluminum has a thermal conductivity lower than that of copper. There are differences in properties such as a weight, workability, etc. depending on the materials. In view of differences in the thermal conductivity and the weight depending on the materials, material costs and working costs, each material of the lateral surface heat dissipation plate 26 and the back surface heat dissipation plate 27 can be determined for providing the desirable cooling property.

When the heat spreader is integrated, it is difficult to change the material. However, when the heat spreader is configured by a plurality of parts, it is easy to change the material.

When the heat spreader is configured by a plurality of parts, the shape or the material can be changed for each part. It is thus possible to regulate the conduction path of the heat generated by the laser 23. For example, the heat spreader can be configured by combining a good thermal conduction part and a heat insulation part. In order to regulate the conduction path of the heat, a necessary part or parts can be used at a necessary site or sites. In this way, the thermal conduction of the heat can be regulated.

When the heat spreader is configured by a plurality of parts, a clearance may be easily provided at the heat spreader or at a front side of (before) the heat spreader (at the side where the lens 21 is attached). By providing the clearance, the heat can be prevented from conducting to the front side, and the lens 21 disposed at the front side may not be affected by the heat.

By providing the clearance at the front side, flatness accuracy of the front surface may not be increased. By providing a flat surface to the minimum necessary, the flatness can be easily obtained. In this way, an effect of a grease coating irregularity can be absorbed by the clearance.

The above-described heat spreader can be applied when the effect by the heat generated from the light source such as the laser and the LED should be decreased and the heat should be released. Accordingly, the light source apparatus 10 used in the projector shown in FIG. 1 is an example to which the present technology is applied.

Also, the present technology can be applied to the apparatus using the light source such as the scanner as well as to the apparatus using the laser as the light source. According to the present technology, the heat diffused from the light source can be efficiently spread. So, the present technology can be applied to illuminations.

The present technology is not limited to the above-described embodiments, and variations and modifications may be made without departing from the spirit and scope of the present technology.

The present technology may have the following configurations.

(1) A light source apparatus, including:
a light source; and
a conductor to conduct heat diffused from the light source to a spreader to spread heat, the conductor having a plurality of parts.

(2) The light source apparatus according to (1) above, in which
the conductor includes
a first part to conduct heat diffused from a back surface of the light source when a light emitted side of the light source is defined as a front surface; and
a second part to conduct heat diffused from a lateral surface of the light source.

(3) The light source apparatus according to (2) above, in which
the second part is sandwiched between the first part and a third part.

(4) The light source apparatus according to (2) above, in which
the first part is made of a material different from the second part.

(5) The light source apparatus according to (1) above, in which
the conductor includes
a first part to directly conducting heat diffused from the light source, and
a second part to indirectly conducting heat diffused from the light source,
the second part being sandwiched between the first part and a third part.

(6) A projector apparatus, including:
a light source apparatus, having:
a light source; and
a conductor to conduct heat diffused from the light source to a spreader to spread heat, the conductor having a plurality of parts.

The present technology contains subject matter related to that disclosed in Japanese Priority Patent Application JP 2012-211621 filed in the Japan Patent Office on Sep. 26, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light source apparatus, comprising:
a plurality of laser light sources, each laser light source including a front surface from which light is emitted, a back surface and a lateral surface; and
a heat dissipater configured to dissipate heat from the laser light sources, the heat dissipater comprising:
a first plate in thermal contact with the back surface of the laser light sources and having apertures through which pass electric terminals to the laser light sources;
a second plate in thermal contact with the first plate and with the lateral surfaces of the laser light sources; and
a third plate in thermal contact with the second plate, wherein the second plate is disposed between the first plate and the third plate, and
wherein at least the first and third plates are screwed together.

2. The light source apparatus according to claim 1, wherein
the second plate has a plurality of holes, and
the plural laser light sources are engaged in respective ones of the plurality of holes.

3. The light source apparatus according to claim 2, wherein
the plurality of holes are arranged in a two dimensional matrix.

4. The light source apparatus according to claim 3, wherein
the number of the plurality of laser light sources is the same as the number of the plurality of holes.

5. The light source apparatus according to claim 1, wherein
the first plate is made of a material different from the second plate.

6. The light source apparatus according to claim 1, wherein
the first plate conducts heat diffused from the laser light sources, and
the second plate conducts heat diffused from the laser light sources to the first plate.

7. The light source apparatus according to claim 1, further comprising a heat sink having heat dissipation fins, the heat sink being connected to the first plate.

8. The light source apparatus according to claim 1, further comprising a coating of grease between the first plate and the second plate.

9. A projector apparatus, comprising:
a light source apparatus, having:
a plurality of laser light sources, each laser light source including a front surface from which light is emitted, a back surface and a lateral surface; and
a heat dissipater for dissipating heat from the laser light sources, the heat dissipater comprising:
a first plate in thermal communication with the back surface of the laser light sources and having apertures through which pass electric terminals to the laser light sources,
a second plate in thermal contact with the first plate and with the lateral surfaces of the laser light sources, and
a third plate in thermal contact with the second plate, wherein the second plate is sandwiched between the first plate and the third plate, and
wherein at least the first and third plates are screwed together.

10. The projector apparatus according to claim 9, wherein the second plate has a plurality of holes, and
the plural laser light sources are engaged in respective ones of the plurality of holes.

11. The projector apparatus according to claim 10, wherein the plurality of holes are arranged in a two dimensional matrix.

12. The projector apparatus according to claim 11, wherein
the number of the plurality of laser light sources is the same as the number of the plurality of holes.

13. The projector apparatus according to claim 9, wherein the first plate is made of a material different from the material of the second plate.

14. The projector apparatus according to claim 9, wherein the first plate conducts heat diffused from the laser light sources, and
the second plate conducts heat diffused from the laser light sources to the first plate.

15. The projector apparatus according to claim 9, further comprising a heat sink having heat dissipation fins, the heat sink being connected to the first plate.

16. The projector apparatus according to claim 9, further comprising a coating of grease between the first plate and the second plate.

* * * * *